(12) United States Patent
Kerschbaumer et al.

(10) Patent No.: US 7,862,492 B2
(45) Date of Patent: Jan. 4, 2011

(54) EXPANDER ROLLER

(75) Inventors: Josef Kerschbaumer, Maria Laach (AT); Georg Gobec, Wiener Neustadt (AT); Norbert Gamsjaeger, Bad Fischau (AT); Benno Bader, Neunkirchen (AT); Thomas Gruber-Nadlinger, Langenrohr (AT)

(73) Assignee: Voith Patent GmbH, Heidenheim (DE)

( * ) Notice: Subject to any disclaimer, the term of this patent is extended or adjusted under 35 U.S.C. 154(b) by 190 days.

(21) Appl. No.: 12/050,611

(22) Filed: Mar. 18, 2008

(65) Prior Publication Data

US 2008/0207419 A1 Aug. 28, 2008

Related U.S. Application Data

(63) Continuation of application No. PCT/EP2006/064138, filed on Jul. 12, 2006.

(51) Int. Cl.
*B21B 27/02* (2006.01)
(52) U.S. Cl. ............ 492/1; 492/2; 492/6; 492/47
(58) Field of Classification Search ........ 492/1, 492/2, 6, 7, 26, 47
See application file for complete search history.

(56) References Cited

U.S. PATENT DOCUMENTS

| | | | |
|---|---|---|---|
| 1,868,860 A | | 7/1932 | Von Reis |
| 3,672,018 A | * | 6/1972 | Junk et al. .................. 492/7 |
| 3,676,909 A | | 7/1972 | Tuomaala |
| 3,728,767 A | * | 4/1973 | Shirai ....................... 26/104 |
| 3,729,788 A | * | 5/1973 | Tawa ........................ 26/104 |
| 4,372,205 A | * | 2/1983 | Pflaum ..................... 101/153 |
| 4,477,954 A | * | 10/1984 | Molinatto ................... 492/7 |
| 4,487,122 A | * | 12/1984 | George et al. ............ 101/153 |
| 4,510,865 A | * | 4/1985 | Molinatto ................ 101/153 |
| 6,468,194 B2 | * | 10/2002 | Wojtkowski et al. ........ 492/47 |

FOREIGN PATENT DOCUMENTS

| | | |
|---|---|---|
| DE | 8801758 U1 | 5/1988 |
| DE | 4034796 A1 | 5/1992 |
| DE | 19927897 | 6/1999 |
| DE | 19945156 | 9/1999 |
| DE | 10144614 A1 | 3/2003 |
| DE | 102004045407 | 9/2004 |
| EP | 0972877 A2 | 1/2000 |
| GB | 2060821 A | 5/1981 |
| WO | WO98/12381 | 3/1998 |

* cited by examiner

*Primary Examiner*—Essama Omgba
(74) *Attorney, Agent, or Firm*—Taylor IP, P.C.

(57) ABSTRACT

A roller for a web-processing machine has a support core, which is braced in the region of both its ends via a respective bearing arrangement, and an outer covering, which in its axially central region is braced in a radially fixed manner in relation to the support core and in the region of its two ends is braced in a radially displaceable manner in relation to the support core by a respective additional bearing arrangement, whereby the radially extending center plane of both the support core bearing arrangement and the outer covering bearing arrangement lies axially within the outer covering, and the outer covering is displaceable in the region of its two ends respectively by an actuator arranged preferably within the outer covering.

64 Claims, 10 Drawing Sheets

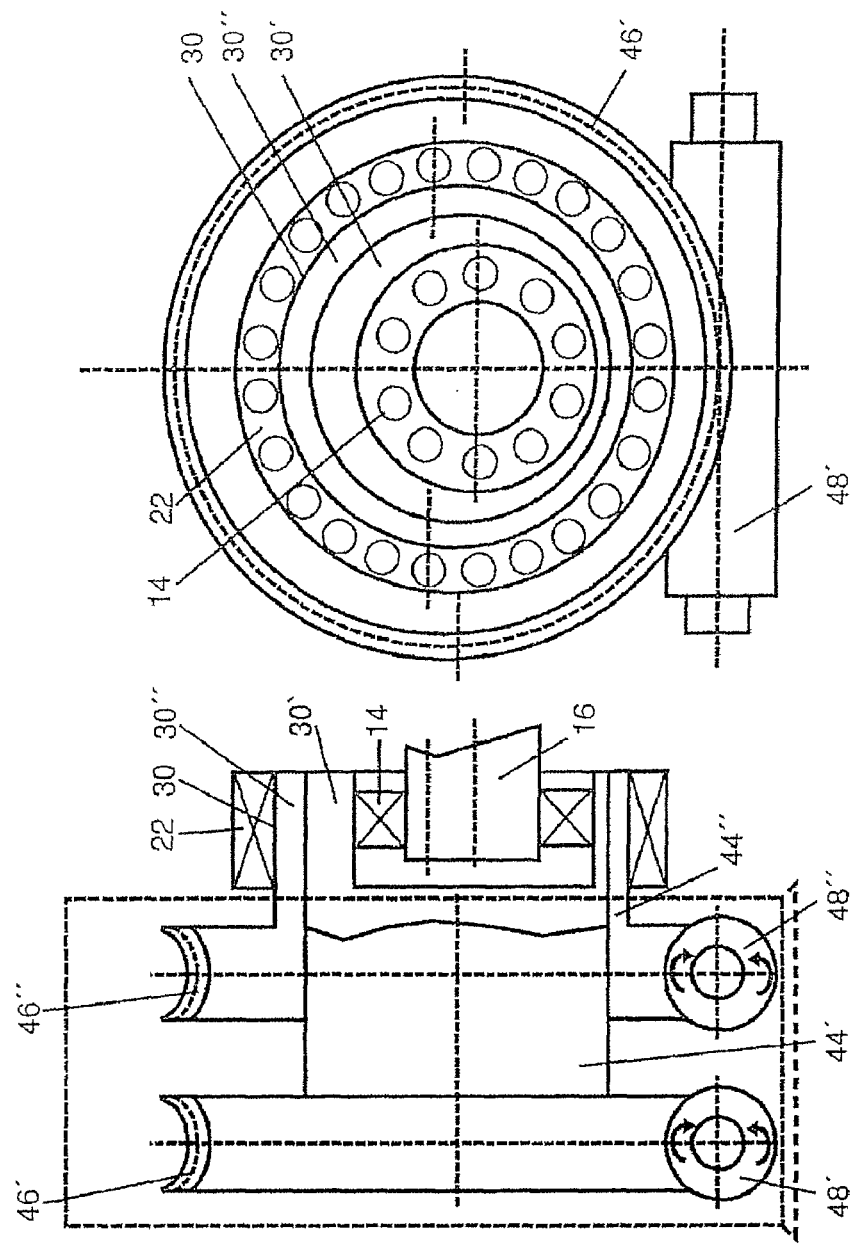

EXPANDER ROLLER

This is a continuation of PCT application No. PCT/EP2006/064138, entitled "EXPANDER ROLLER", filed Jul. 12, 2006, which is incorporated herein by reference.

BACKGROUND OF THE INVENTION

1. Field of the Invention

This invention relates to a roller for a web-processing machine. In this case said machine can be in particular a machine for producing a fibrous web, in particular a paper web, paperboard web or tissue web. In addition the invention relates to a web-processing machine with such a roller.

2. Description of the Related Art

To guide the web on web-processing machines, provision has been made up to now for arrangements on which in particular guide rollers, regulation rollers and expander rollers are arranged in succession. Such a conventional arrangement is shown for example in FIG. 1 in which a guide roller 54 and an expander roller 56 are arranged in succession upstream from a pair of press rollers 52 looking in the web running direction L. A side view of this arrangement is shown in the left-hand part and a plan view in the right-hand part of FIG. 1.

A disadvantage of these known arrangements are, among other things, their high investment and maintenance costs.

Because of the simple construction of a guide roller, its components are extremely economical. However, it is a disadvantage that the web run can be negatively influenced through compliance of the guide roller.

Expander rollers are used in web-processing machines in order to prevent fold formation or sagging on a running material web by expanding the material web. Also, expander rollers are used to guide apart material webs that are arranged side by side and parallel with each other. Material webs arranged side by side and parallel with each other can be produced by slitting a wide material web for example. Such expander rollers are known for example from DE 199 27 897 A1 and DE 10 2004 045 407 A1.

Expander rollers often include of several individually mounted segments which entail a high level of maintenance and are accordingly cost-intensive. The maintenance costs of such an expander roller generally equal approximately 60% of the new price. Furthermore, the usual expander rollers used hitherto have a very slim construction and an accordingly low load-carrying capacity so that their use as a guide roller is ruled out.

The newest expander roller versions based on high-performance plastics have optimized curvatures. The disadvantage of said versions is however that the constructions in question are not torque-free mounted, meaning that the support of the machine in question, for example a paper machine, is loaded in undesirable manner. In the case of new plants, account must be given to the torques arising, which requires cost-intensive reinforcements. In the case of existing plants, even more expensive auxiliary structures are required.

What is needed in the art is an improved roller of the type initially referred to, with which the previously mentioned problems are eliminated. In this case the roller in question should be able to perform several of the previously mentioned functions simultaneously. In particular the torques introduced into the support should also be reduced to a minimum.

SUMMARY OF THE INVENTION

The present invention provides a roller for a web-processing machine, said roller having a support core, which is braced in the region of both its ends via a respective bearing arrangement, and an outer covering, which in its axially central region is braced in a radially fixed manner in relation to the support core and in the region of its two ends is braced in a radially displaceable manner in relation to the support core by a respective additional bearing arrangement, whereby the radially extending center plane of both the support core bearing arrangement and the outer covering bearing arrangement lies axially within the outer covering, and the outer covering is displaceable in the region of its two ends respectively by an actuator arranged preferably within the outer covering.

As the result of this construction, the roller in question is able to perform the functions of at least two different roller types simultaneously. By accordingly omitting one roller, construction space is saved accordingly. A cost-saving construction is generally possible.

As previously mentioned, the combination of at least two functions in one roller is accompanied by the advantage of considerable cost cuts. In particular the function group's construction space is reduced, mesh and felt costs are lowered, and because fewer spare rollers need to be kept in stock the cost of maintenance and the cost of stock-keeping for spare parts are reduced accordingly. Finally, the result is a lower level of product variety, which leads likewise to reduced costs.

In particular the torque channeled into the support is reduced to a minimum in this case, whereby it can be reduced even to zero in the optimum case. The fact that the actuator is also arranged within the outer covering results in a compact adjusting device which enables the forces for the adjustment to be reduced and the forces arising to be contained.

According to a practical embodiment of the inventive roller, the actuators are adjustable or controllable such that the functions of at least two of the following types of roller are performed simultaneously with the one roller: expander roller; guide roller; regulation roller, in particular a web run regulation roller or a type of controlled deflection roller; and tension roller.

Advantageously the actuators are adjustable or controllable such that the functions of a guide roller and an expander roller are performed simultaneously with the one roller.

It is also an advantage in particular for the actuators to be adjustable or controllable such that the functions of a guide roller and a tension roller are performed simultaneously with the one roller.

According to another embodiment, the actuators are adjustable or controllable such that the functions of a guide roller and a regulation roller are performed simultaneously with the one roller.

Also possible in particular is a version on which the actuators are adjustable or controllable such that the functions of an expander roller and a regulation roller are performed simultaneously with the one roller.

On another expedient embodiment of the inventive roller, the actuators are adjustable or controllable such that the functions of an expander roller and a tension roller are performed simultaneously with the one roller.

Another expedient version is characterized in that the actuators are adjustable or controllable such that the functions of a tension roller and a regulation roller are performed simultaneously with the one roller.

To minimize static loads and undesirable vibrations, the roller has preferably an outer diameter >280 mm, in particular >300 mm and preferably >320 mm. In this case a stable expanding effect is achieved as the result.

In particular in order to perform the functions of an expander roller, the actuators are advantageously adjustable or controllable at least such that the roller is curved and pivoted into the web.

In particular in order to perform the functions of a guide roller and/or a regulation roller, the actuators are expediently adjustable or controllable at least such that a compliance of the roller due to its own dead weight and/or because of the web tension is compensated at least essentially.

The actuators can be adjustable or controllable dependent on the different operating states in the respective installed situations. For example a tension roller can be adjusted via the actuators according to the respective conditions and requirements in the desired manner. The same applies also for the other types of roller.

In particular in order to perform the functions of a web run regulation roller, the actuators are advantageously differently adjustable or controllable at the drive end and at the operator end in order to bring about an inclined position of the roller.

Hence it is possible, through separate adjustment of the end regions of the roller independently of each other, to perform another function, namely that of a regulation roller.

The actuator is advantageously arranged radially between the support core bearing arrangement and the outer covering bearing arrangement.

On a practical embodiment of the inventive roller, the actuator is braced on the support.

Advantageously the actuator includes at least one eccentric, whereby preferably two inter-mounted eccentrics are provided.

Expediently the two eccentrics are adjustable jointly and/or separately.

With such an eccentric arrangement, the position of the curvature height or magnitude of curvature and/or the position of the curvature plane can be adjusted in each case separately or jointly or simultaneously.

With a view to as torque-free a bearing arrangement as possible, it is an advantage for the respectively radially extending center planes of the support core bearing arrangement and the outer coating bearing arrangement to coincide at least essentially. Advantageously provision is made therefore for an aligned or symmetrical arrangement of the support core bearings and the outer covering bearings.

A practical embodiment of the inventive roller is characterized in that the support core bearing arrangement and the outer covering bearing arrangement include respectively only one bearing and in that the support core bearing and the outer covering bearing are arranged at least essentially in a common radial plane.

Advantageously it is also possible for the support core bearing arrangement and/or the outer covering bearing arrangement to include respectively two or more bearings.

If the outer covering bearing arrangement includes two or more bearings, then the radially extending center plane of said outer covering bearing arrangement expediently coincides at least essentially with the radially extending center plane of the support core bearing arrangement. If the support core bearing arrangement is formed by only one bearing, then said support core bearing is preferably arranged at least essentially in the radially extending center plane of the outer covering bearing arrangement.

In principle it is also possible however for the support core bearing arrangement to include two or more bearings. In this case the bearings of the outer covering bearing arrangement and the bearings of the support core bearing arrangement are advantageously arranged respectively symmetrically with regard to a radial plane common to the two bearing arrangements.

If the support core bearing arrangement includes two or more bearings, then the radially extending center plane of said support core bearing arrangement expediently coincides at least essentially with the radially extending center plane of the outer covering bearing arrangement.

If the outer covering bearing arrangement includes only one bearing in this case, then said outer covering bearing is preferably arranged at least essentially in the radially extending center plane of the support core bearing arrangement.

If the outer covering bearing arrangement also includes two or more bearings, then the bearings of the support core bearing arrangement and the bearings of the outer covering bearing arrangement are again advantageously arranged respectively symmetrically with regard to a radial plane common to both bearing arrangements.

Through the corresponding arrangement of the bearings and/or the actuator there results a very rigid construction which is particularly insensitive to vibrations. Vibrations which arise nevertheless can at least be reduced by suitable damping elements. On a practical embodiment provision is made for example for damping ways between the support core bearing arrangement and the outer covering bearing arrangement. In this case a viscous liquid can be inserted into the hollow space between the support core bearing arrangement and the outer covering bearing arrangement.

It is also possible for example to provide a membrane in the region between the support core bearing arrangement and the outer covering bearing arrangement.

Alternatively or in addition it is an advantage for the roller to be fastened via vibration-damping elements on the support. Alternatively or in addition it can also be fastened in particular via actively damping hydraulic elements on the support.

Due to the small construction space it may be necessary to use small bearings and preferably bearings which unite the bearing function and an angle-compensating function in one. The support core bearing arrangement and/or the outer covering bearing arrangement respectively can include at least one angle-compensating bearing.

In particular in the case of high forces, the support core bearing arrangement and/or the outer covering bearing arrangement include preferably in particular at least one tapered-roller bearing, cylindrical-roller bearing or spherical-roller bearing which, because they permit no angle adjustment, must be mounted such that an angle adjustability of the outer covering axis and/or the support core axis is guaranteed.

On a practical embodiment of the inventive roller, the support core is rotatable jointly with the outer covering. In this case the outer covering can be non-rotatably connected to the support core.

Also possible in principle, however, are for example such versions on which the support core is non-rotatable about its longitudinal axis.

It is also an advantage in particular for the support core to have, looking in the axial direction, a different cross-sectional shape at least in some sections. In this case the support core can have, in particular at least in some sections, a cross-sectional shape which tapers conically towards its ends.

On the inventive roller the force flow, which is caused by the corresponding construction and the loads arising, is thus transferred as directly as possible and without auxiliary structures between the two bearing arrangements.

The inventive web-processing machine is characterized in that it includes at least one inventive roller and a preferably electronic open-loop control device and/or closed-loop control device by way of which the actuators of the roller are accordingly controllable.

In this case preferably at least one sensor for determining the web position is connected to the closed-loop control device so that the web position is controllable by way of said closed-loop control device controlling the actuators.

Advantageously provision is made for at least one position sensor integrated in the roller.

Expediently provision is made for respectively at least one position sensor in the edge regions of the web. In this case it is possible in particular for respectively at least one position sensor to be integrated in the two end regions of the roller.

In principle it is also possible however for provision to be made for at least one position sensor arranged outside the roller.

According to another advantageous embodiment of the inventive machine, at least one sensor for determining the web tension is connected to the closed-loop control device so that the web tension is controllable by way of said closed-loop control device controlling the actuators.

Provision can be made for at least one web tension sensor integrated in the roller.

Also possible however is at least one web tension sensor arranged outside the roller.

The sensors in question can be for example optical sensors, pressure sensors, mechanical sensors and/or the like.

The inventive roller can thus be used as a universal roller which simultaneously performs the functions of at least two of the following types of roller: expander roller, guide roller, regulation roller, in particular a web run regulation roller or a controlled deflection roller, and tension roller.

To monitor the bearings of the roller it is possible in addition to provide a vibration sensor which detects the vibration state of the roller and sends the measured vibration values for example to a closed-loop control system which dampens the vibrations by suitable ways.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 is a schematic representation in cross section of an end of an inventive roller with an assigned support core bearing arrangement, outer covering bearing arrangement and actuator, and with a worm gear assigned to the actuator;

FIG. 6 shows a schematic side view in partial section of the roller end according to FIG. 5;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 2:
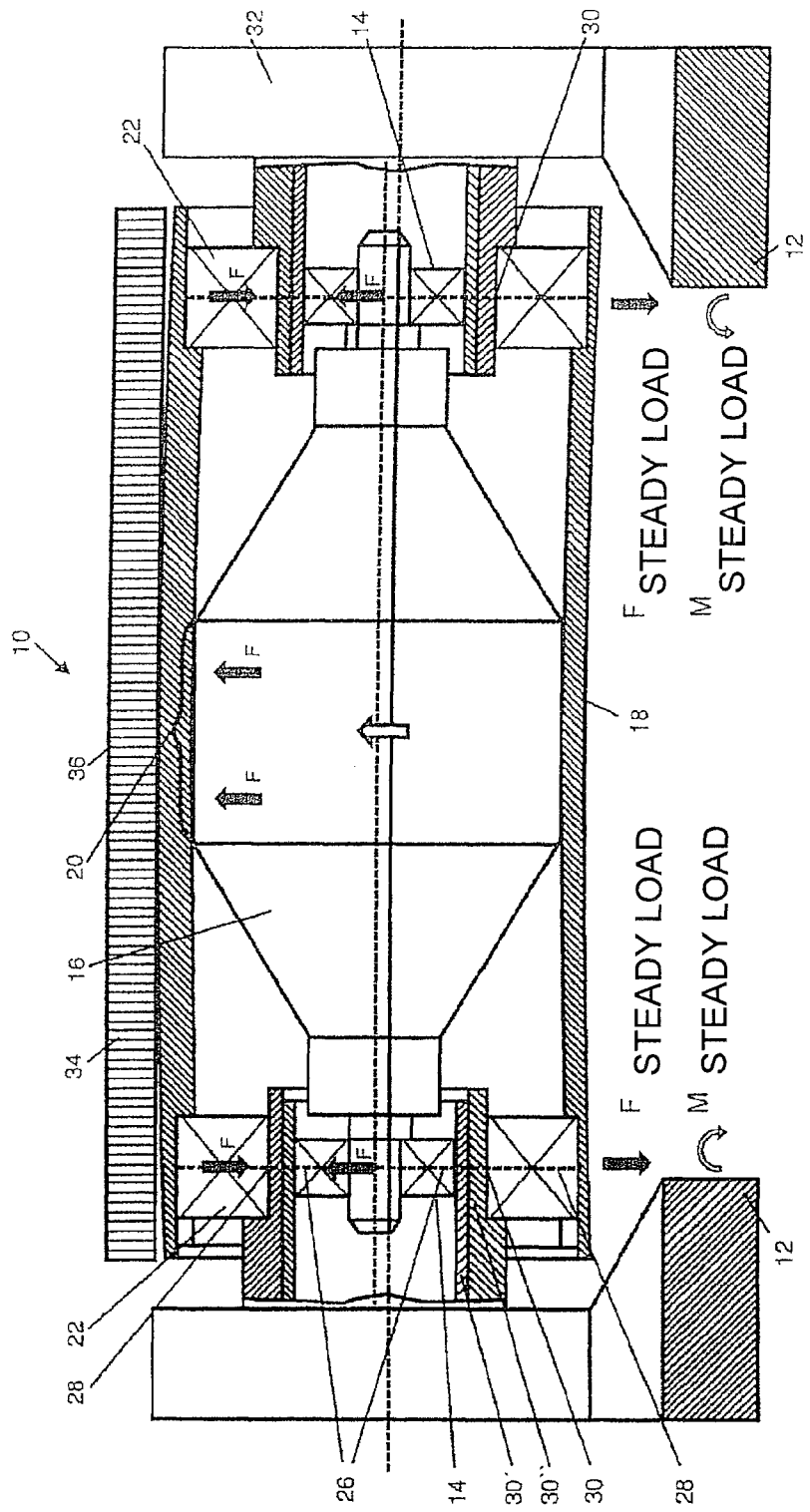
FIG. 2 is a schematic representation in longitudinal section of an inventive roller with an assigned support.

Referring now to the drawings, and more particularly to FIG. 2, there is shown in a schematic representation in longitudinal section a roller 10 with an assigned support 12. Said roller 10 can be used in particular on a web-processing machine, in particular a paper machine. In this case said roller can be used preferably as an expander roller, guide roller, regulation roller, in particular a web run regulation roller or a type of controlled deflection roller, and/or as a tension roller. Preferably it simultaneously performs the functions of at least two of the roller types mentioned.

As is evident from FIG. 2, the roller 10 has a support core 16, which is braced in the region of its two ends by way of a respective bearing arrangement 14, and an outer covering 18.

In its axially central region 20 the outer covering 18 is mounted in a radially fixed manner in relation to the support core 16 and in the region of its two ends is braced in a radially displaceable manner in relation to the support core 16 by a respective additional bearing arrangement 22.

As can be seen in FIG. 2, the radially extending center plane 26 and 28 of respectively the support core bearing arrangement 14 and the outer covering bearing arrangement 22 lie within the outer covering.

In the region of its two ends, the outer covering 18 is adjustable respectively by an actuator 30 which is arranged within the outer covering 18 radially between the support core bearing arrangement 14 and the outer covering bearing arrangement 22. Said actuator 30 is braced on the support 12 and is variably adjustable by way of a pivot gear, in particular a worm gear 32 (described in more detail in the following).

Also evident from FIG. 2 is a material web 34 which is passed over the roller 10; said web can be for example a paper web, paperboard web or tissue web.

Said material web 34 is accompanied by a corresponding web tension and hence a steady load 36 which results solely in a small tilting torque which is introduced into the support 12.

The actuator 30 includes two inter-mounted eccentrics which can be adjusted jointly or separately.

In the state shown, the roller is curved. For this purpose the support core is displaced by the actuator including the two eccentrics. The force for lifting the support core is introduced in the inner eccentric. The outer covering is curved with the force and braces itself on the outer covering bearing arrangements. Because said bearing arrangements lie in one plane, no torque arises. The precondition for this are pivotable bearings.

For the roller to adopt its non-curved neutral position, the actuator must be adjusted such that the eccentricity of the inner eccentric is displaced by 180° in relation to the eccentricity of the outer eccentric.

In the case in question the bearing arrangements provided are for example self-aligning roller bearings etc. As is evident from FIG. 2, the outer covering bearing arrangement provided on the left-hand roller end is a floating bearing and the outer covering bearing arrangement provided on the right-hand roller end is a fixed bearing. The support tube bearing arrangements are formed respectively by a floating bearing.

Figure 3:
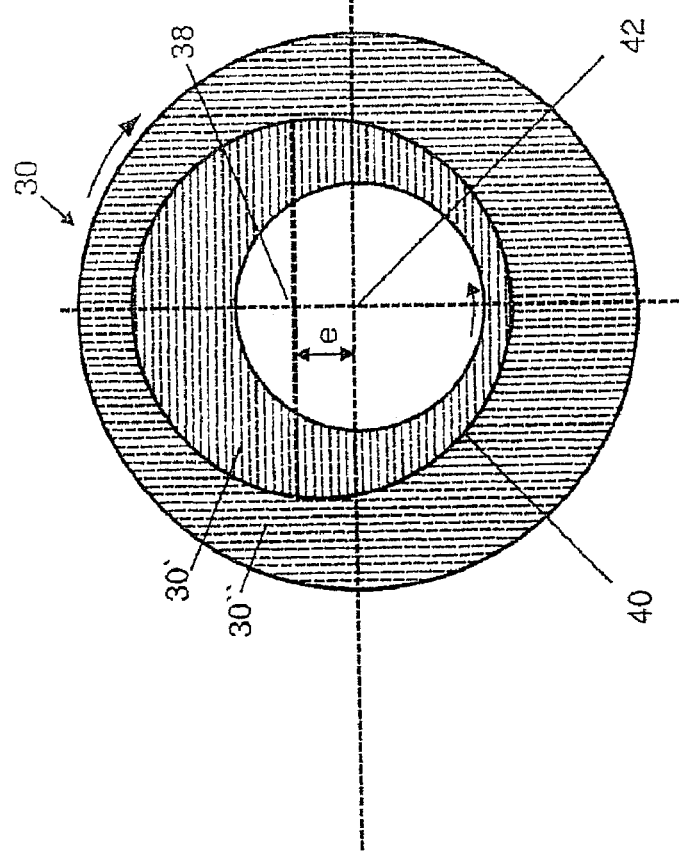
FIG. 3 is a schematic representation in cross section of an actuator, which includes a double eccentric, of an inventive roller in the zero position.

FIG. 3 shows in a schematic representation in cross section the actuator 30, which includes the two eccentrics 30', 30", in a zero position in which the maximum eccentric of the inner eccentric 30' coincides with the minimum eccentricity of the outer eccentric 30". Hence the axis 38 of the circular cylindrical interface 40 between the two eccentrics 30', 30" is displaced here upwards by an amount "e" in relation to the axis 42 of the support core bearing arrangement 14, thus resulting also in a corresponding positioning of the outer covering bearing arrangement 22 and hence of the roller covering end in question.

Figure 4:
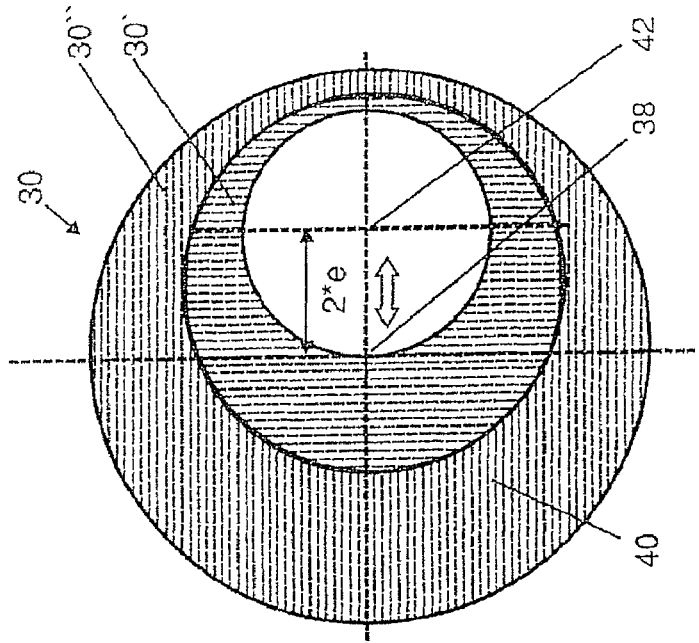
FIG. 4 is a schematic representation in cross section of an actuator, which includes a double eccentric, of an inventive roller in a setting for effecting a maximum displacement.

FIG. 4 shows a representation comparable with FIG. 3, whereby in the case in question the actuator 30 including the two eccentrics 30', 30" is adjusted such that a maximum displacement results. In this case the extremities of the two eccentrics 30', 30" coincide. Accordingly the axis 38 of the circular cylindrical interface 40 between the two eccentrics 30', 30" is displaced here for example to the left by the amount "2e" in relation to the axis 42 of the support core bearing arrangement 14, thus resulting again in a corresponding displacement of the outer covering bearing arrangement 22 and hence of the roller covering end in question.

The extremities of the two eccentrics 30', 30" are therefore equally large.

FIG. 5 shows in a schematic representation in cross section a roller end with assigned support core bearing arrangement 14, outer covering bearing arrangement 22, actuator 30 and a double pivot mechanism (cf. also FIG. 6) for adjusting the two eccentricities 30', 30" of the actuator 30.

In view of the small construction space available, use is made of in particular small bearing arrangements, preferably bearings, for example self-aligning bearings, which unite the bearing function and the angle-compensating function in one. For higher forces, provision is made for preferably tapered-roller bearings, cylindrical-roller bearings or spherical-roller bearing (also several), which however must be mounted such that an angle changeability of the axis of the outer covering 18 and/or the axis of the support core 16 can be guaranteed.

FIG. 6 shows the roller end in a schematic side view in partial section.

As can be seen from FIGS. 5 and 6, the two eccentrics 30', 30" are connected respectively via an eccentric shaft 44', 44" to a worm gear 46', 46", to which is assigned a respective worm shaft 48', 48", by way of which the two eccentrics 30', 30" are jointly or separately rotatable.

As is best evident from FIG. 5, turning the eccentrics 30', 30" results in a corresponding adjustment of the eccentricity and position of the roller end in question.

Figure 7:
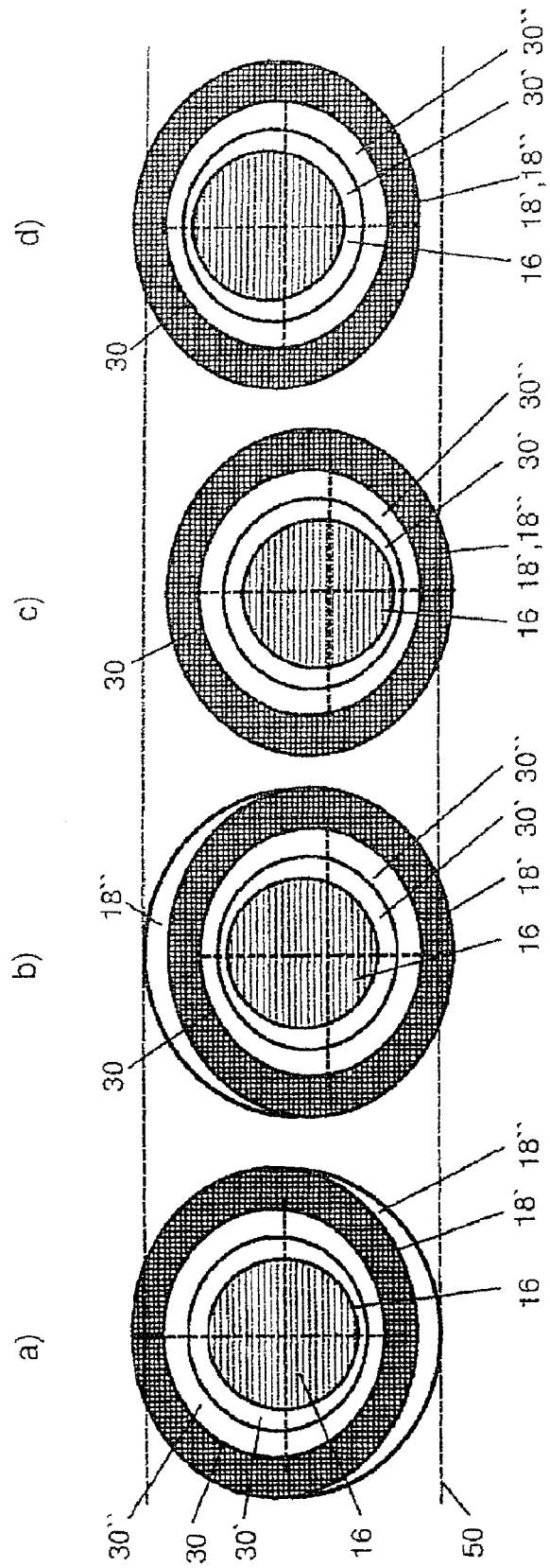
FIG. 7 shows a simplified schematic representation in cross section of an end of an inventive roller with an assigned actuator compared to the outer covering position in the region of the web center at different settings of the actuator.

FIG. 7 shows a simplified schematic representation in cross section a roller end with an assigned actuator 30 compared to the outer covering position in the region of the web center at different settings of the actuator 30.

In said FIG. 7, the neutral line of the outer covering 18 has the reference number "50". Also evident in the various sections a) to d), in addition to the two eccentrics 30', 30" of the actuator 30, are the support core 16 and the outer covering 18, whereby 18' represents the position of the outer covering 18 at a respective roller end and 18" the position of the outer covering 18 in the web center.

According to FIG. 7a), the two eccentrics 30', 30" are adjusted such that the maximum curvature of the outer covering 18 points downwards and the outer covering 18 in the region of the two roller ends is displaced upwards.

According to FIG. 7b), the two eccentrics 30', 30" are adjusted such that the maximum curvature of the outer covering 18 points upwards and the outer covering 18 at the roller ends is displaced downwards.

According to FIG. 7c), the two eccentrics 30', 30" are adjusted such that no curvature of the covering arises and the outer covering is displaced downwards.

According to FIG. 7d), the two eccentrics 30', 30" are adjusted such that no curvature of the covering arises and the outer covering 18 is displaced upwards.

In the two cases mentioned in FIGS. 7c and 7d, the outer covering 18 is without curvature and oblique relative to the support core 16. As a result it is also possible to realize a guide function with the expander roller.

Of course it is also possible for the outer covering 18 to be simultaneously curved relative to the support core 16 and simultaneously oblique relative to the support core 16.

Figure 1:
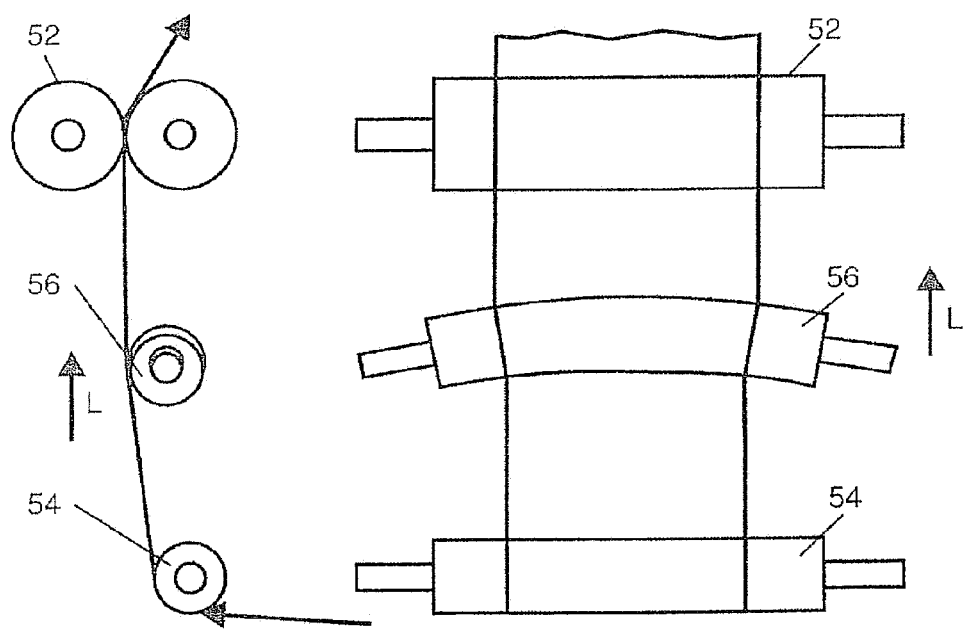
FIG. 1 shows a schematic representation of a conventional arrangement in which a guide roller and an expander roller are arranged in succession upstream from a pair of press rollers in the web running direction.
Figure 8:
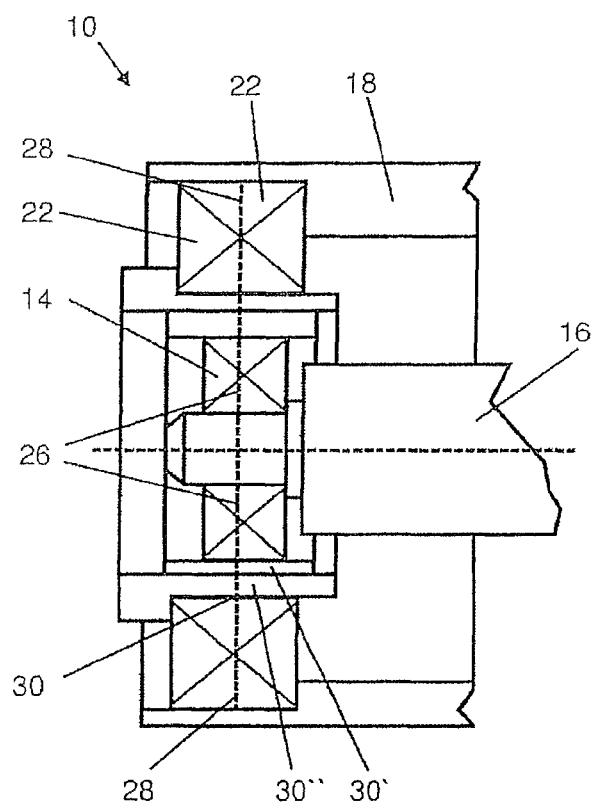
FIG. 8 is a schematic representation in longitudinal section of an end of the inventive roller according to FIG. 2, whereby the support core bearing arrangement and the outer covering bearing arrangement include respectively only one bearing.

FIG. 8 shows in a schematic representation in longitudinal section one end of the expander roller 10 according to FIG. 1.

In this case the support core bearing arrangement 14 and the outer covering bearing arrangement 22 include respectively only one bearing. In this case the support core bearing and the outer covering bearing are arranged in a common radial plane. The outer covering bearing has larger dimensions than the support core bearing. In this case the respectively radially extending center planes 26 and 28 of the support core bearing arrangement 14 and the outer covering bearing arrangement 22 coincide. Also evident again in said FIG. 7 are the outer covering 18, the support core 16 and the actuator 30. With some versions of bearings it is possible that the normally more powerful outer tube bearing is converted by smaller rollers etc. to the approximately same load capacity as the inner tube bearing. Hence with a small curvature, the two bearings have an approximately identical minimum load, which results in rolling of the inner tube bearing and the outer tube bearing, meaning that sliding of the rolling bearings and its destructive effect on the bearings are reduced or largely prevented.

The result is a favorable arrangement because direct bracing leads to a reduction of the load on the intermediate sleeves and eccentrics and enables a very rigid low-vibration construction.

Said arrangement can be realized only if the outer diameter of the support core bearing resulting from the roller diameter and the size of the outer covering bearing is still possible for bearings with corresponding load ratings.

Figure 9:
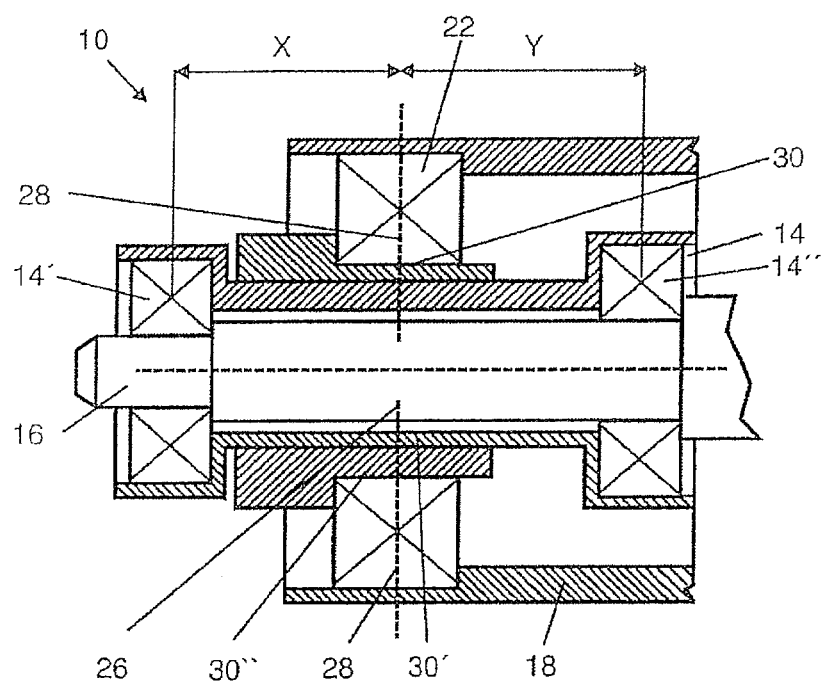
FIG. 9 shows a representation comparable with that from FIG. 8, whereby however the support core bearing arrangement includes two bearings.

FIG. 9 shows a representation comparable with that from FIG. 8, whereby however in the case in question the support core bearing arrangement 14 includes two axially spaced bearings 14', 14". Here too the outer covering bearing arrangement 22 is again formed by only one bearing.

While the right-hand bearing 14" of the support core bearing arrangement 14 is arranged within the outer covering 18, the left-hand bearing 14' lies outside said outer covering 18. However, the center plane 26 of said support core bearing arrangement 14 still lies clearly within the outer covering 18. The bearing of the outer covering bearing arrangement 22 is again larger than the bearings 14', 14" of the support core bearing arrangement 14.

As is evident from FIG. 9, the radially extending center plane 26 of the support core bearing arrangement 14 coincides with the radially extending center plane 28 of the outer covering bearing arrangement 22.

Here too the actuator including the two eccentrics 30', 30" is arranged radially between the support core bearing arrangement, which includes the two bearings 14', 14", and the outer covering bearing arrangement 22.

When using differently sized bearings, the axial distances x and y can differ in order to obtain a load distribution proportional to the load capacity of the bearings.

Given an oblique position of the roller, a corresponding oblique position of the bearings must be enabled in order to obtain a torque-free state. This can be effected either directly by selecting an angle-adjustable bearing or, as is required for a twin arrangement, by way of a seat in the plane of force introduction which permits an oblique position, as is the case for example with a spherical seat.

The arrangement of the outer covering bearing 22 represented in FIG. 9 can also be realized by two or more bearings. Similarly, the number of support core bearings is not limited to two bearings. When using two or more bearings per axis of rotation, the direct bracing and adjustment of the double eccentric bearing arrangement shown by way of example must be effected by accordingly powerful bearing housings which divert internally the force onto two or more bearings and are loaded therefore by an internal torque.

Figure 10:
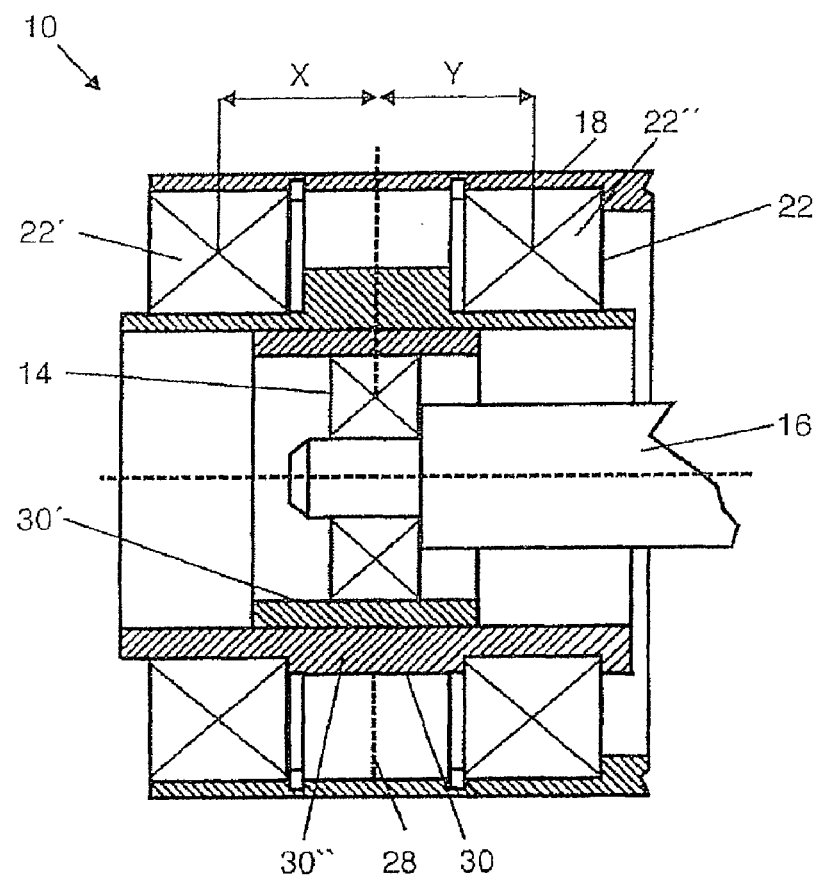
FIG. 10 shows a representation comparable with that from FIG. 8, whereby however the outer covering bearing arrangement includes two bearings.

FIG. 10 shows a representation comparable with that from FIG. 8, whereby however in the case in question the outer covering bearing arrangement 22 includes two bearings 22', 22".

The bearings 22', 22" of the outer coating bearing arrangement 22 are larger in the case in question than the support core bearing arrangement 14, which again is formed by only one bearing.

In the case in question, both the support core bearing arrangement 14 and the outer covering bearing arrangement 22 lie respectively completely within the outer covering 18.

As previously mentioned, the support core bearing arrangement 14 in the case in question includes only one bearing. As is evident from FIG. 10, said support core bearing is arranged in the radially extending center plane 28 of the outer covering bearing arrangement 22. Here too the radially extending center plane 28 of the outer covering bearing arrangement 22 again coincides therefore with the radially extending center plane 26 of the support core bearing arrangement 14.

Also possible in principle are such versions on which both the support core bearing arrangement 14 and the outer covering bearing arrangement 22 include respectively two or more bearings. Such designs with respectively two or more bearings are used in order to achieve a higher overall bearing load capacity and/or they are used in cases in which the radially available construction space is not sufficient for an arrangement made of radially nested bearings.

The support core 16 can be rotatable jointly with the outer covering 18. In this case the outer covering 18 can be non-rotatably connected to the support core 16.

Also possible in principle, however, are such versions on which the support core 18 is non-rotatable about its longitudinal axis.

As is evident from FIG. 2, the support core 16 can have, looking in the axial direction, a different cross-sectional shape at least in some sections. In the case in question, said support core 16 has, at least in some sections, a cross-sectional shape which tapers conically towards its ends.

Figure 11:
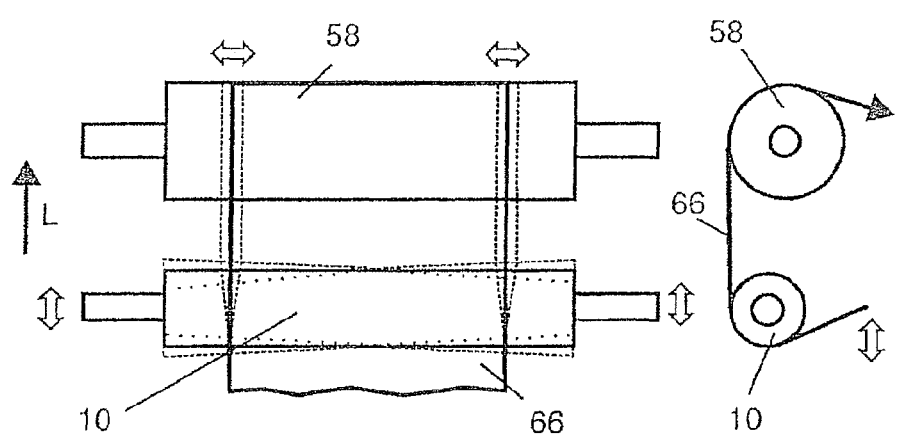
FIG. 11 shows a schematic representation of an inventive roller which is arranged upstream from another roller in the web running direction and simultaneously performs the functions of several different roller types.

FIG. 11 shows in a schematic representation an inventive roller 10 which is arranged upstream from another roller 58 in the web running direction L and simultaneously performs the functions of several different roller types. In this case the left-hand part of FIG. 11 shows a plan view and the right-hand part of said FIG. 11 shows a side view of the arrangement in question.

As said FIG. 11 shows, the inventive roller can be used simultaneously for example as an expander roller and a controlled or regulation roller.

Hence the actuators 30 (cf. also FIGS. 1 to 10) are adjustable or controllable, in particular in order to perform the functions of an expander roller, such that the roller is curved and pivoted into the web while on the other hand they are differently adjustable or controllable in particular in order to perform the functions of a regulation or web run regulation roller at the drive end and at the operator end in order to bring about an inclined position of the roller. Hence it is possible for example for the two actuators to be adjusted at the drive end and at the operator end such that the curvature remains constant but the axis of the support core is adjusted to the inverse control of the actuators at the two roller ends.

Figure 12:
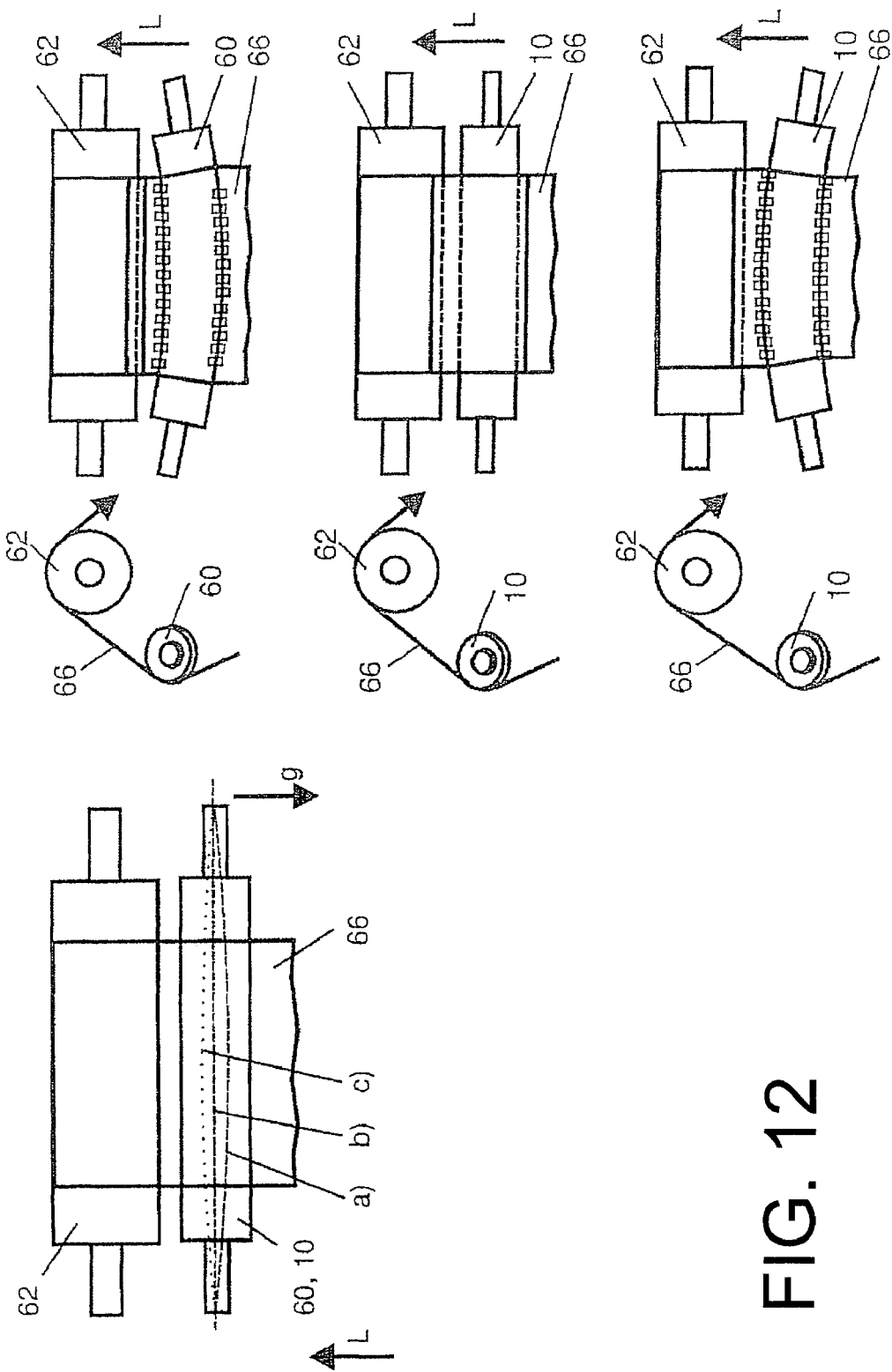
FIG. 12 shows a schematic representation in which two arrangements b) and c), on which respectively an inventive roller performing the functions of several different roller types is arranged upstream from another roller in the web running direction, are compared with an arrangement a) with a conventional guide roller.

FIG. 12 shows in a schematic representation an arrangement a) with a conventional guide roller 60, which is arranged upstream from another roller 62 in the web running direction L. Said conventional arrangement is compared with two arrangements b) and c), in which respectively an inventive roller 10 performing the functions of several different roller types is arranged upstream from another roller 64 in the web running direction.

Evident in the left-hand part of the FIG. 12 is the respective sagging of the rollers 10, 60. The corresponding arrangements a) to c) are shown respectively in a side view in the middle of FIG. 12. The arrangements are shown again in a plan view in the right-hand part of FIG. 12.

As is evident from FIG. 12*a*), the arrangement including the conventional guide roller results in sagging, which is due to the dead weight, and web tension, whereby the paper or web 66 is compressed.

On the other hand, FIG. 12*b*) shows an inventive compensated roller 10 without sagging, which here performs simultaneously for example the functions of a guide roller and a regulation roller. The actuators 30 (cf. also FIGS. 2 to 11) are again also adjustable or controllable at least such that a compliance of the roller 10 due to its own dead weight and/or because of the web tension is compensated at least essentially. The roller 10 is again arranged upstream from another roller 62 in the web running direction L.

Again FIG. 12*c*) also shows an arrangement in which an inventive roller 10 performing the functions of several different roller types is arranged upstream from another roller 62 in the web running direction L. In the case in question, the actuators (cf. again FIGS. 2 to 11) provided at the two roller ends are adjustable or controllable such that the functions of a guide roller and an expander roller are simultaneously performed with the roller 10. As is evident from said FIG. 12, the result in the case in question is a deflection of the roller 10 upwards or towards the web 66.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

10 Roller
12 Support
14 Support core bearing arrangement
14' Bearing
14" Bearing
16 Support core
18 Outer covering
20 Center region
22 Outer covering bearing arrangement
26 Center plane of the support core bearing arrangement
28 Center plane of the outer covering bearing arrangement
30 Actuator
30' Eccentric
30" Eccentric
32 Pivot gear, worm gear
34 Material web
36 Steady load
38 Axis
40 Circular cylindrical interface
42 Axis of the support core bearing arrangement
44' Eccentric shaft
44" Eccentric shaft
46' Worm gear
46" Worm gear
48' Worm shaft
48" Worm shaft
50 Neutral line of the outer covering
52 Press roller pair
54 Guide roller
56 Expander roller
58 Another roller
60 Guide roller
62 Roller
64 Roller
66 Web
L Web running direction

What is claimed is:

1. A roller for a machine which processes a web of fibrous material, said roller comprising:
   two support core bearing arrangements;
   a support core including two end regions each of which is braced respectively by one of said support core bearing arrangements, each of said support core bearing arrangements defining a radially extending center plane;
   two outer covering bearing arrangements;
   an outer covering including an axially central region and two end regions, said outer covering being mounted, in said axially central region, in a radially fixed manner relative to said support core, each of said end regions of said outer covering being braced in a radially displaceable manner relative to said support core respectively by one of said outer covering bearing arrangements, each of said outer covering bearing arrangements defining a radially extending center plane, said radially extending center plane of each of said support core bearing arrangements and said radially extending center plane of each of said outer covering bearing arrangements lying axially within said outer covering, each of said outer covering bearing arrangements being spaced apart relative to each of said support core bearing arrangements; and
   two actuators, each of said end regions of said outer covering being displaceable respectively by one of said actuators, said actuators being one of adjustable and controllable such that the roller is configured for performing simultaneously a plurality of functions of at least two of an expander roller, a guide roller, a regulation roller, and a tension roller.

2. The roller according to claim 1, wherein said two actuators are arranged within said outer covering.

3. The roller according to claim 1, wherein said actuators are one of adjustable and controllable such that the roller is configured for performing simultaneously said plurality of functions of said guide roller and said expander roller.

4. The roller according to claim 1, wherein said actuators are one of adjustable and controllable such that the roller is configured for performing simultaneously said plurality of functions of said guide roller and said tension roller.

5. The roller according to claim 1, wherein said actuators are one of adjustable and controllable such that the roller is configured for performing simultaneously said plurality of functions of said guide roller and said regulation roller.

6. The roller according to claim 1, wherein said actuators are one of adjustable and controllable such that the roller is configured for performing simultaneously said plurality of functions of said expander roller and said regulation roller.

7. The roller according to claim 1, wherein said actuators are one of adjustable and controllable such that the roller is configured for performing simultaneously said plurality of functions of said expander roller and said tension roller.

8. The roller according to claim 1, wherein said actuators are one of adjustable and controllable such that the roller is configured for performing simultaneously said plurality of functions of said tension roller and said regulation roller.

9. The roller according to claim 1, wherein the roller has an outer diameter >280 mm.

10. The roller according to claim 9, wherein the roller has an outer diameter >300 mm.

11. The roller according to claim 10, wherein the roller has an outer diameter >320 mm.

12. The roller according to claim 1, wherein said actuators are one of adjustable and controllable such that the roller is curved and pivoted into the web and thereby is configured for performing said plurality of functions of said expander roller.

13. The roller according to claim 1, wherein said actuators are one of adjustable and controllable such that a compliance of the roller at least one of due to a dead weight of the roller and because of the web tension is compensated at least essentially and thereby the roller is configured for performing said plurality of functions of at least one of said guide roller and said regulation roller.

14. The roller according to claim 1, wherein said actuators are one of adjustable and controllable dependent on a plurality of different operating states respecting a plurality of installed situations.

15. The roller according to claim 1, wherein said regulation roller is one of a web run regulation roller and a controlled deflection roller.

16. The roller according to claim 1, wherein the roller includes a drive end and an operator end and said actuators are at least one of differently adjustable and differently controllable at said drive end and at said operator end in order to bring about an inclined position of the roller, and thereby the roller is configured for performing a plurality of functions of a web run regulation roller.

17. The roller according to claim 1, wherein each said actuator is arranged radially between one said support core bearing arrangement and one said outer covering bearing arrangement.

18. The roller according to claim 1, further including a support, wherein each said actuator is braced on said support.

19. The roller according to claim 1, wherein each said actuator includes at least one eccentric.

20. The roller according to claim 19, wherein said at least one eccentric includes two inter-mounted eccentrics.

21. The roller according to claim 20, wherein said two eccentrics of each said actuator are at least one of adjustable jointly and separately.

22. The roller according to claim 1, wherein said radially extending center plane of each said support core bearing arrangement coincides at least essentially with a corresponding one said radially extending center plane of said outer covering bearing arrangement.

23. The roller according to claim 1, wherein each said support core bearing arrangement and each said outer covering bearing arrangement includes respectively only one bearing, each said support core bearing arrangement being arranged at least essentially in a common radial plane as a corresponding one said outer covering bearing arrangement.

24. The roller according to claim 1, wherein at least one of a) each said support core bearing arrangement and b) each said outer covering bearing arrangement includes respectively at least two bearings.

25. The roller according to claim 24, wherein each said outer covering bearing arrangement includes at least two bearings, each said radially extending center plane of said outer covering bearing arrangements coinciding at least essentially with a corresponding one of said radially extending center planes of said support core bearing arrangements.

26. The roller according to claim 25, wherein each said support core bearing arrangement includes only one bearing, each said support core bearing arrangement being arranged at least essentially in a corresponding one of said radially extending center planes of said outer covering bearing arrangements.

27. The roller according to claim 25, wherein each said support core bearing arrangement includes at least two bearings.

28. The roller according to claim 27, wherein said bearings of each said outer covering bearing arrangement and said bearings of each said support core bearing arrangement are arranged respectively symmetrically with regard to a radial plane common to corresponding ones of said support core bearing arrangements and said outer covering bearing arrangements.

29. The roller according to claim 24, wherein each said support core bearing arrangement includes at least two said bearings, said radially extending center plane of each said support core bearing arrangement coinciding at least essentially with said radially extending center plane of a corresponding said outer covering bearing arrangement.

30. The roller according to claim 29, wherein each said outer covering bearing arrangement includes only one said bearing, said bearing of said outer covering bearing arrangement being arranged at least essentially in a corresponding said radially extending center plane of said support core bearing arrangement.

31. The roller according to claim 29, wherein each said outer covering bearing arrangement includes at least two said bearings.

32. The roller according to claim 31, wherein said bearings of each said support core bearing arrangement and said bearings of each said outer covering bearing arrangement are arranged respectively symmetrically with regard to a radial plane common to corresponding ones of said support core bearing arrangements and said outer covering bearing arrangements.

33. The roller according to claim 1, further including a damping device between a respective said support core bearing arrangement and a respective said outer covering bearing arrangement.

34. The roller according to claim 33, further including a viscous liquid, each said support core bearing arrangement and a corresponding said outer covering bearing arrangement defining a hollow space therebetween, said viscous liquid being in said hollow space.

35. The roller according to claim 33, further including a membrane, each said support core bearing arrangement and a corresponding said outer covering bearing arrangement defining a region therebetween, said membrane being in said region.

36. The roller according to claim 1, further including a support and a plurality of vibration-damping elements, the roller being fastened via said plurality of vibration-damping elements on said support.

37. The roller according to claim 1, further including a support and a plurality of actively damping hydraulic elements, the roller being fastened via said plurality of actively damping hydraulic elements on said support.

38. The roller according to claim 1, wherein at least one of a) each said support core bearing arrangement and b) each said outer covering bearing arrangement includes respectively one angle-compensating bearing.

39. The roller according to claim 1, wherein at least one of a) each said support core bearing arrangement and b) each said outer covering bearing arrangement includes respectively at least one self-aligning bearing.

40. The roller according to claim 1, wherein at least one of a) each said support core bearing arrangement and b) each said outer covering bearing arrangement includes respectively one of at least one tapered-roller bearing, at least one cylindrical-roller bearing, and at least one spherical-roller bearing.

41. The roller according to claim 1, wherein said support core is rotatable via said support core bearing arrangements about a longitudinal axis of said support core.

42. The roller according to claim 41, wherein said support core is rotatable jointly with said outer covering.

43. The roller according to claim 41, wherein said outer covering is non-rotatably connected to said support core.

44. The roller according to claim 1, wherein said support core is non-rotatable about a longitudinal axis of said support core.

45. The roller according to claim 1, wherein said support core has, in an axial direction of said support core, a different cross-sectional shape at least in some sections of said support core.

46. The roller according to claim 45, wherein said support core includes a plurality of ends and has, at least in some sections of said support core, a cross-sectional shape which tapers conically towards said plurality of ends.

47. A machine which processes a web of fibrous material, said machine comprising:
at least one roller for the machine, said roller including:

two support core bearing arrangements;

a support core including two end regions each of which is braced respectively by one of said support core bearing arrangements, each of said support core bearing arrangements defining a radially extending center plane;

two outer covering bearing arrangements;

an outer covering including an axially central region and two end regions, said outer covering being mounted, in said axially central region, in a radially fixed manner relative to said support core, each of said end regions of said outer covering being braced in a radially displaceable manner relative to said support core respectively by one of said outer covering bearing arrangements, each of said outer covering bearing arrangements defining a radially extending center plane, said radially extending center plane of each of said support core bearing arrangements and said radially extending center plane of each of said outer covering bearing arrangements lying axially within said outer covering, each of said outer covering bearing arrangements being spaced apart relative to each of said support core bearing arrangements; and two actuators, each of said end regions of said outer covering being displaceable respectively by one of said actuators, said actuators being one of adjustable and controllable such that said roller is configured for performing simultaneously a plurality of functions of at least two of an expander roller, a guide roller, a regulation roller, and a tension roller.

48. The machine according to claim 47, wherein said at least one roller includes at least one of an electronic open-loop control device and a closed-loop control device, said actuators being controllable using at least one of said electronic open-loop control device and said closed-loop control device.

49. The machine according to claim 48, further including at least one sensor for determining a position of the web, said at least one sensor being connected to said closed-loop control device, said position of the web being controllable using said closed-loop control device controlling said actuators.

50. The machine according to claim 49, wherein at least one said sensor is integrated in the roller.

51. The machine according to claim 49, wherein the web defines two edge regions, at least one said sensor being located in each of said edge regions of the web.

52. The machine according to claim 51, wherein the roller defines two edge regions, at least one said sensor being integrated in each of said edge regions of the roller.

53. The machine according to claim 49, wherein at least one said sensor is arranged outside the roller.

54. The machine according to claim 48, further including at least one sensor for determining a web tension, said at least one sensor being connected to said closed-loop control device, said web tension being controllable using said closed-loop control device controlling said actuators.

55. The machine according to claim 54, wherein at least one said sensor is integrated in the roller.

56. The machine according to claim 54, wherein at least one said sensor is arranged outside the roller.

57. A method of using a roller for a machine which processes a web of fibrous material, said method comprising the steps of:

providing that the roller includes:

two support core bearing arrangements;

a support core including two end regions each of which is braced respectively by one of said support core bearing arrangements, each of said support core bearing arrangements defining a radially extending center plane;

two outer covering bearing arrangements;

an outer covering including an axially central region and two end regions, said outer covering being mounted, in said axially central region, in a radially fixed manner relative to said support core, each of said end regions of said outer covering being braced in a radially displaceable manner relative to said support core respectively by one of said outer covering bearing arrangements, each of said outer covering bearing arrangements defining a radially extending center plane, said radially extending center plane of each of said support core bearing arrangements and said radially extending center plane of each of said outer covering bearing arrangements lying axially within said outer covering; and two actuators, each of said end regions of said outer covering being displaceable respectively by one of said actuators; and using the roller as a universal roller which simultaneously performs a plurality of functions of at least two of an expander roller, a guide roller, a regulation roller, and a tension roller.

58. The method according to claim 57, wherein said regulation roller is one of a web run regulation roller and a controlled deflection roller.

59. The method according to claim 57, wherein the roller simultaneously performs said plurality of functions of said guide roller and said expander roller.

60. The method according to claim 57, wherein the roller simultaneously performs said plurality of functions of said guide roller and said tension roller.

61. The method according to claim 57, wherein the roller simultaneously performs said plurality of functions of said guide roller and said regulation roller.

62. The method according to claim 57, wherein the roller simultaneously performs said plurality of functions of said expander roller and said regulation roller.

63. The method according to claim 57, wherein the roller simultaneously performs said plurality of functions of said expander roller and said tension roller.

64. The method according to claim 57, wherein the roller simultaneously performs said plurality of functions of said tension roller and said regulation roller.

* * * * *